Aug. 12, 1947.    M. A. EDWARDS    2,425,606
ELECTRIC VALVE CONTROL CIRCUIT
Filed Dec. 5, 1940
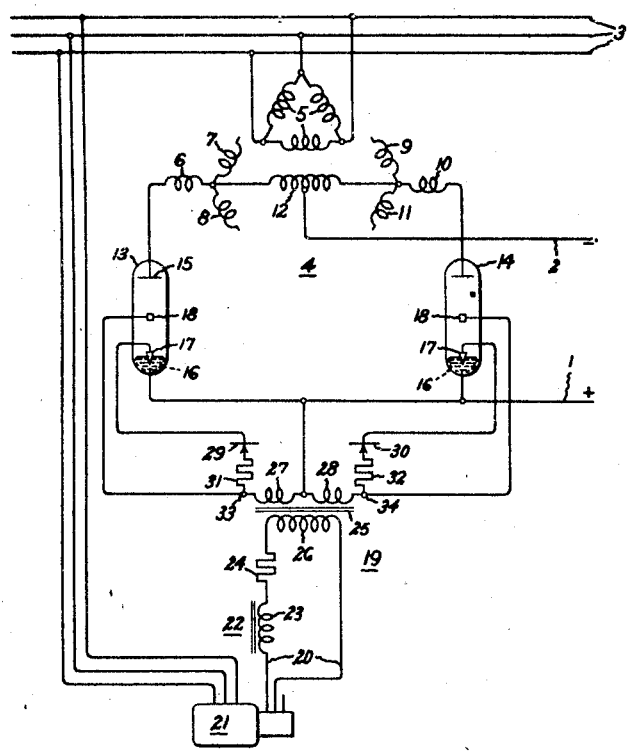
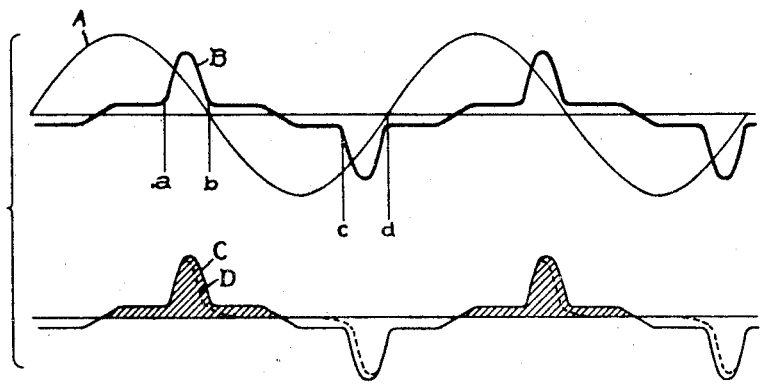
Inventor:
Martin A. Edwards,
by Harry E. Dunham
His Attorney.

Patented Aug. 12, 1947

2,425,606

UNITED STATES PATENT OFFICE 2,425,606

ELECTRIC VALVE CONTROL CIRCUIT

Martin A. Edwards, Scotia, N. Y., assignor to General Electric Company, a corporation of New York Application December 5, 1940, Serial No. 368,669

10 Claims. (Cl. 175—363)

1

My invention relates to electric valve circuits and more particularly to excitation circuits for controlling electric valve means of the type comprising an immersion-igniter or make-alive electrode.

In the control of electric valve apparatus using an immersion-ignitor control member for initiating an arc discharge, it has been found desirable to supply to the control member a voltage of substantially peaked wave form in order to assure the positive initiation of the arc discharges and in order to reduce the period of time during which the control member is required to conduct current. The use of the voltage of peaked wave form in this manner serves to reduce the duty imposed on the control member and accomplishes this result without sacrificing precision of control as to the time at which the electric valve means is to be rendered conducting.

It is an object of my invention to provide a new and improved electric valve translating circuit.

It is another object of my invention to provide a new and improved electric control circuit for supplying a voltage of peaked wave form to an electric valve means employing an immersion-ignitor control member.

It is a further object of my invention to provide a new and improved excitation circuit for electric valves using immersion-ignitor control members in which an inductive device is symmetrically saturable with respect to both the positive and negative half cycles of voltage supplied thereto, and in which an alternating voltage of peaked wave form is employed to energize the control members of a pair of electric valve means which are intended to conduct current alternately during intervals displaced one hundred eighty electrical degrees.

Briefly stated, in the illustrated embodiment of my invention I provide an excitation circuit for supplying an alternating voltage of peaked wave form to a pair of electric valves which are intended to conduct current during intervals displaced one hundred eighty electrical degrees. The excitation circuit includes a source of alternating current and a serially connected resistance and an inductive device which is symmetrically saturable, that is, it saturates in a similar manner during both negative and positive half cycles of voltage of the source so that a symmetrical alternating voltage of peaked wave form is provided.

For a better understanding of my invention, reference may be had to the following description

2 taken in connection with the accompanying drawing, and its scope will be pointed out in the appended claims. Fig. 1 of the drawings diagrammatically illustrates an embodiment of my invention as applied to a polyphase rectifying system, and Fig. 2 represents certain operating characteristics of the excitation system shown in Fig. 1.

Referring now to Fig. 1, my invention is there diagrammatically illustrated as applied to electric translating apparatus, such as an electric valve system, for interconnecting a direct current circuit including conductors 1 and 2 and a polyphase alternating current supply circuit 3. The translating apparatus may include a transformer 4 comprising a plurality of primary windings 5 and two groups of secondary windings 6—8 and 9—11. Where it is desired that the system operate as a double Y or double three-phase system, the two groups of secondary windings may be interconnected through an interphase transformer 12 so that each secondary winding conducts current in parallel with windings in the other group; that is, each secondary winding conducts current during 120 electrical degrees of the voltage of circuit 3 but for only 60 electrical degrees with any one winding in the other group.

The translating system also includes a plurality of electric valve means each connected to one of the secondary windings 6—11. For the purpose of simplifying the presentation of the present invention, only electric valve means 13 and 14, which are shown connected to secondary windings 6 and 10, are shown. It will be understood that corresponding electric valves may be connected to the other secondary windings in the same manner. The electric valves 13 and 14 are of the type comprising an ionizable medium, such as a gas or a vapor, which is capable of supporting an arc discharge and each comprises an anode 15, a self-reconstructing cathode, such as a mercury pool cathode 16, an associated make-alive electrode or, as illustrated, an immersion-ignitor control member 17, and a transfer or auxiliary anode 18. The immersion-ignitor control member 17 is of the type comprising a material such as boron-carbide or silicon-carbide having an electrical resistivity which is high compared with that of the mercury, and is arranged to have an extremity thereof extending below the surface of the mercury pool cathode 16. The control member 17 requires the transmission of a predetermined current therethrough in order to initiate a cathode spot on the surface of the associated mercury pool cathode 16. Arc discharges are initiated by transmitting to the control member 17 an impulse of current of sufficient magnitude to establish a cathode spot on the cathode and which is effective to ionize the mercury vapor within the electric valve means and to establish an arc discharge between the anode 15 and the cathode 16 so that the electric valve means conducts current.

I provide an excitation circuit 19 of an improved type which produces an alternating voltage of peaked wave form having peaks of a symmetrical nature and which are displaced relative to each other by substantially one hundred eighty electrical degrees to render the electric valve means 13 and 14 conducting during intervals of time having a similar displacement. The excitation circuit 19 comprises a source of alternating current 20 of the same frequency as that of circuit 3. It will be understood that the source 20 may be derived from a separate or independent source, or may be derived from the alternating current circuit 3 through a suitable phase shifting device 21. The excitation circuit 19 includes a saturable inductive device 22 having a winding 23. The inductive device 22 is designed to be symmetrically saturable with respect to both the positive and the negative half cycles of current supplied by the source 20.

Winding 23 is connected in series relation with a resistance 24 and both of these elements are connected in series relation with a suitable inductance which may be provided by means, such as a transformer 25, having a primary winding 26 and which may include a pair of secondary windings 27 and 28. The inductance of the primary winding 26, which is connected in series relation with winding 23 and resistance 24, serves to produce across the terminals of the winding 26 an alternating voltage of peaked wave form which is symmetrical with respect to both the positive and negative half cycles and which induces in secondary windings 27 and 28 alternating voltages of peaked wave form.

Means are provided for connecting the secondary windings 27 and 28 to the immersion-ignitor control members 17 so that only positive impulses of peaked voltage are supplied to these control members. This means may comprise suitable rectifiers or unidirectional conducting devices, such as rectifiers 29 and 30 and current transfer resistances 31 and 32 which are connected between secondary windings 27 and 28 and control members 17 of electric valve means 13 and 14, respectively. The common junctures 33 and 34 of secondary windings 27 and 28 and the transfer resistances 31 and 32 are connected to the auxiliary anodes 18 of electric valve means 13 and 14, respectively. The purpose of the transfer resistances 31 and 32 is to raise the potentials of the common junctures 33 and 34 in order to transfer the excitation current from the control members 17 to the auxiliary electrodes 18 as soon as arc discharges are established within the electric valve means.

The operation of the embodiment of my invention shown in Fig. 1 will be explained by considering the system when it is operating as a polyphase rectifier to supply the direct current load circuit from the alternating current supply circuit 3. The electric valve means are rendered conducting in a predetermined order or sequence, and by virtue of the operation of the interphase transformer 12 the system operates as a double three-phase system. Electric valve means associated with diametric secondary windings are rendered conducting during intervals displaced one hundred eighty electrical degrees. For example, electric valve means 13 and 14, which are connected to secondary windings 6 and 10 respectively, are rendered conducting during intervals displaced one hundred eighty electrical degrees. Consequently, in order to render these valves conducting, the voltages supplied to the control members 17 must be displaced by an equal amount. The excitation circuit 19 supplies positive impulses of voltage to the control members 17 and similar excitation circuits (not shown) also control electric valves which are connected to secondary windings 7 and 11, and 8 and 9, respectively.

Referring more particularly to the operation of the excitation circuit 19, the voltages induced in the secondary windings 27 and 28 are alternating voltages of peaked wave form which are symmetrical; that is, the positive and negative half cycles are of symmetrical wave form. The saturable inductive device 22 is designed to be symmetrically saturable with respect to both the positive and negative half cycles of voltage of source 20. As a result, there appears across the primary winding 26 of transformer 25 an alternating voltage of peaked wave form and this, of course, causes the induction of peaked alternating voltages of symmetrical wave form across the terminals of secondary windings 27 and 28. By virtue of the operation of unidirectional conducting devices or rectifiers 29 and 30, only unidirectional impulses of current are transmitted to control members 17.

The operation of the excitation circuit 19 may be more fully appreciated by referring to the operating characteristics shown in Fig. 2 where curve A represents the voltage of source 20 and the heavy curve B represent the voltage of peaked wave form applied across the terminals of primary winding 26. Curve B is a third harmonic current wave superimposed on a fundamental wave displaced from the voltage of the source 20 by an angle corresponding to the power factor angle of the circuit including winding 23, resistance 24 and winding 26. Considering the operation of the circuit during a positive half cycle of voltage of source 20, until the device 22 saturates most of the voltage will appear across winding 23 and very little voltage will appear across winding 26. At time $a$, the device 22 saturates, causing a substantial increase of current through the circuit and effecting an increase in the voltage applied across winding 26 to produce a peak voltage during interval $a$—$b$. In a correseponding manner, a peak of voltage is produced across winding 26 during interval $c$—$d$ occurring during the negative half cycle of voltage of source 20. Curve C represents the approximate wave form of the voltage appearing across the terminals of secondary windings 27 and 28.

Rectifying devices 29 and 30 operate so that only the positive portion of the wave is impressed on the control members 17. For example, only the shaded portion of curve C will be impressed on control member 17 of electric valve means 13 and the other portions or half cycles of voltage of opposite polarity will be supplied to the control member 17 of electric valve means 14. It will be appreciated that the impulses supplied to the control member 17 of electric valve means 14 are also positive impulses relative to that control member. Upon initiation of an arc discharge within the electric valve means, the current supplied to the control members increases due to the fact that the effective resistance, or part of the resistance offered by the control members 17, is reduced, effecting reduction in the voltage applied to control member 17. This reduction in voltage is, of course, due principally to resistances 31 and 32 and consequently the resultant voltage applied to control members 17 takes the form of the dotted curves D. As soon as an arc discharge is initiated within the electric valve means 13 or 14, the current is transferred from the control member 17 to the auxiliary electrode 18 by operation of the resistance 31 or resistance 32 which raises the potential of the common junctures 33 and 34. In this manner, the duty imposed on control members 17 is substantially reduced so that the control members are not required to conduct current after the arc discharges have been initiated.

The magnitude of the voltage applied to the direct current load circuit may be controlled by operating the phase shifter 21. In this manner the phase relation of the current impulses supplied to the control members 17 is controlled relative to the respective anode-cathode voltages of electric valve means 13 and 14. As the peaks of current are brought more nearly into phase coincidence with the beginning of the positive half cycles of applied anode-cathode voltage from a lagging position, the magnitude of the voltage applied to the load circuit is increased, and, conversely, as the phase of these impulses is retarded, the voltage applied to the load circuit is decreased.

An important advantage of apparatus built in accordance with my invention is the simplicity of construction and reduction in cost in the provision of a satisfactory and highly precise excitation circuit for energizing or controlling electric valve means of the type using immersion-ignitor control members. The use of a saturable device, such as device 22, in combination with a resistance 24 and a suitable transformer 25 reduces substantially the cost of the excitation system when compared with prior art arrangements.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a load circuit, electric translating apparatus connected between said circuits and comprising a pair of electric valve means each comprising an anode, a cathode and an immersion-ignitor control member and employing an ionizable medium capable of supporting an arc discharge, an excitation circuit for rendering the electric valve means conducting alternately during intervals displaced one hundred eighty electrical degrees with respect to the voltage of said alternating current circuit and comprising an inductive device having a winding and means for supplying a peaked alternating current of symmetrical wave form to said winding comprising a source of alternating current connected to energize said winding through a series-connected resistance and an inductive means which is symmetrically saturable with respect to half cycles of voltage of both polarities of said source and which is connected in series with said winding so that the current traversing said winding is of the same magnitude as the current traversing said inductive means, and means for energizing said control members in accordance with the voltage of said winding.

2. In combination, an alternating current circuit, a load circuit, electric translating apparatus connected between said circuits and comprising a pair of electric valve means each comprising an anode, a cathode, an immersion-ignitor control member and a transfer anode and employing an ionizable medium capable of supporting an arc discharge, a source of alternating current, an excitation circuit for producing an alternating voltage of peaked wave form having peaks displaced substantially one hundred eighty electrical degrees for rendering said pair of electric valve means conducting alternately during intervals displaced substantially one hundred eighty electrical degrees and comprising in series relation a resistance and a saturable inductive device, said saturable inductive device being saturable during both negative and positive half cycles of voltage of said source, a transformer having a primary winding connected in series relation with said resistance and said inductive device so as to be traversed by current of substantially the same magnitude as the current traversing said saturable inductive device and having a secondary winding, means for connecting said secondary winding to the immersion-ignitor control members of the pair of electric valve means and means for connecting the secondary winding to the transfer anodes.

3. In combination, an alternating current circuit, a load circuit, electric translating apparatus connected between said circuits and comprising a pair of electric valve means each comprising an anode, a cathode, an immersion-ignitor control member and a transfer anode and employing an ionizable medium capable of supporting an arc discharge, and an excitation circuit for rendering the electric valve means conducting alternately during intervals displaced one hundred eighty electrical degrees and comprising a transformer having a primary winding and a pair of secondary windings, means for connecting one of the secondary windings to the control member and transfer anode of one electric valve means and means for connecting the other secondary winding to the control member and transfer anode of the other electric valve means, means for supplying an alternating current of peaked wave form to said primary winding comprising a source of alternating current and a serially connected resistance and a saturable inductive device connected in series relation with said primary winding so that said winding is traversed by current of substantially the same magnitude as the current traversing said saturable inductive device, said saturable inductive device being saturable during both negative and positive half cycles of voltage of said source.

4. In combination, an alternating current circuit, a load circuit, electric translating apparatus connected between said circuits and comprising a pair of electric valve means each comprising an anode, a cathode, an immersion-ignitor control member, a source of alternating current, and an excitation circuit energized from said source for rendering said electric valve means conducting alternately and including means for producing an alternating voltage of peaked wave form including in series relation an inductive device, a current limiting resistance and a transformer having a primary winding connected in series relation with said resistance and said inductive device so that said winding is traversed by current of substantially the same magnitude as the current traversing said inductive device and including a pair of secondary windings, said inductive device being saturable during half cycles of voltage of both polarities of said source, means for connecting one of said secondary windings to the control member of one of said electric valve means and means for connecting the other secondary winding to the control member of the other electric valve means.

5. In combination, an alternating current circuit, a load circuit, electric translating apparatus connected between said circuits and comprising a pair of electric valve means each comprising an anode, a cathode, an immersion-ignitor control member, a source of alternating current, and an excitation circuit energized from said source for rendering said electric valve means conducting alternately and including means for producing an alternating voltage of peaked wave form including in series relation an inductive device, a current limiting resistance and a transformer having a primary winding connected in series relation with said resistance and said inductive device so that said winding is traversed by current of substantially the same magnitude as the current traversing said inductive device and including a pair of secondary windings, said inductive device being saturable during half cycles of voltage of both polarities, means comprising a unidirectional conducting device for connecting the control member of one of said electric valve means to one of said secondary windings and means including a second unidirectional conducting device for connecting the other secondary winding to the control member of the other electric valve means.

6. In combination, an alternating current circuit, a load circuit, electric translating apparatus connected between said circuits and comprising a pair of electric valve means each comprising an anode, a cathode, an immersion-ignitor control member and a transfer electrode, a source of alternating current, an excitation circuit energized from said source for rendering said electric valve means conducting alternately and including means for producing an alternating voltage of peaked wave form comprising in series relation an inductive device, a current limiting resistance and a transformer having a primary winding connected in series relation with said resistance and said inductive device so that said winding is traversed by current of substantially the same magnitude as the current traversing said inductive device and including a pair of secondary windings, said inductive device being saturable during half cycles of voltage of both polarities of said source, means comprising rectifying means for connecting one of the secondary windings to the control member of one of the electric valve means and means comprising rectifying means for connecting the other secondary winding to the control member of the other electric valve means, and means for connecting each of the secondary windings to the transfer electrode of the associated electric valve means.

7. In combination, an alternating current circuit, a load circuit, electric translating apparatus connected between said circuits and comprising a pair of electric valve means each comprising an anode, a cathode and an immersion-ignitor control member and employing an ionizable medium capable of supporting an arc discharge, and excitation means energized from said alternating current circuit for rendering said pair of electric valve means conducting alternately during intervals of time displaced 180 electrical degrees with respect to the voltage of said alternating current circuit and comprising a saturable inductive reactance which is symmetrically saturable with respect to half cycles of voltage of both polarities of said alternating current circuit and means connected to said control member and effective only in combination with the control member immersed in said cathode to pass sufficient current in each half cycle of voltage of said alternating current circuit to cause said saturable inductive reactance to saturate for producing a peaked alternating voltage of symmetrical wave form between said control member and its cathode and unidirectional conducting means connected between the last mentioned means and the immersion-ignitor control members to transmit only unidirectional current thereto.

8. In combination, an alternating current circuit, a load circuit, electric translating apparatus connected between said circuits and comprising a pair of electric valve means each comprising an anode, a cathode and an immersion-ignitor control member and employing an ionizable medium capable of supporting an arc discharge, means energized from said alternating current circuit for rendering said electric valve means conducting alternately during intervals displaced 180 electrical degrees with respect to the voltage of said alternating current circuit and comprising a saturable inductive reactance which is symmetrically saturable with respect to half cycles of voltage of both polarities of said alternating current circuit and means connected in series relation with said control member and said saturable inductive reactance for jointly effecting saturation of said saturable inductive reactance in each half cycle of the voltage of said alternating current circuit for producing a peaked alternating voltage of symmetrical wave form between said control member and said cathode, unidirectional conducting means connected between the last mentioned means and the immersion-ignitor control members, and phase shifting means for controlling the time of occurrence of the peaked alternating voltage with respect to the voltage of said alternating current circuit.

9. In combination, an alternating current supply circuit, a load circuit, electric translating apparatus connected between said circuits and comprising a pair of electric valve means each including an anode, a cathode, and a make-alive control member, and employing an ionizable medium capable of supporting an arc discharge, an excitation circuit, means energized from said alternating current circuit for impressing an alternating current voltage on said excitation circuit, said excitation circuit comprising a saturable inductive reactance which is symmetrically saturable with respect to half cycles of voltage of both polarities of said alternating current voltage, and a circuit energized through said saturable inductive reactance and including connections with the control members and said cathodes to effect saturation of said saturable inductive reactance in each half cycle of said alternating current voltage by virtue of the inclusion of said control member-cathode connections in said last mentioned circuit for supplying an impulse of current to the control member of one of said valves in accordance with voltage peaks of said inductive reactance occasioned by saturation thereof during half cycles of voltage of one polarity of said alternating current voltage, and for supplying an impulse of current to the control member of the other of said valve means in accordance with voltage peaks of said saturable inductive reactance occasioned by saturation thereof during half cycles of opposite polarity of said alternating current voltage.

10. In combination, an alternating current supply circuit, a load circuit, electric translating apparatus connected between said circuits and comprising a pair of electric valve means each including an anode, a cathode, and a make-alive control member, and employing an ionizable medium capable of supporting an arc discharge, an excitation circuit, means energized from said alternating current circuit for impressing an alternating current voltage on said excitation circuit, said excitation circuit comprising a saturable inductive reactance which is symmetrically saturable with respect to half cycles of voltage of both polarities of said alternating current voltage, inductive means connected in series with said saturable inductive reactance including a pair of end terminals and an intermediate terminal, means connecting said intermediate terminal with the cathodes of said electric valves and means connecting each of said end terminals with the control member of a different one of said valves, said inductive means and the control member-cathode circuit of said electric valve means being effective only in combination to produce saturation of said saturable inductive reactance to render said pair of electric valve means conductive during intervals of time displaced 180 electrical degrees with respect to the voltage of said alternating current circuit in response to the symmetrical alternating current voltage of peaked wave form produced by saturation of said inductive reactance.

MARTIN A. EDWARDS.

REFERENCES CITED

The following references are of record in the file of this patent:

UNITED STATES PATENTS

| Number | Name | Date |
|---|---|---|
| 1,935,464 | Willis | Nov. 14, 1933 |
| 2,104,633 | Alexanderson | Jan. 4, 1938 |
| 2,190,774 | Edwards | Feb. 20, 1940 |
| 2,137,148 | Suits | Nov. 15, 1938 |
| 2,246,181 | Morton | June 17, 1941 |
| 2,248,600 | Alexanderson et al. | July 8, 1941 |
| 2,248,624 | Herskind | July 8, 1941 |